United States Patent [19]

Latshaw

[11] Patent Number: 5,117,483
[45] Date of Patent: May 26, 1992

[54] DIGITAL PROCESSING SYSTEM FOR VIDEO AND TELEVISION SIGNAL GENERATION

[75] Inventor: Don Latshaw, Tigard, Oreg.

[73] Assignee: Magni Systems, Inc., Beaverton, Oreg.

[21] Appl. No.: 365,843

[22] Filed: Jun. 13, 1989

[51] Int. Cl.⁵ .............................................. G06F 15/63
[52] U.S. Cl. ...................................................... 395/100
[58] Field of Search ................ 364/518, 521; 358/12, 358/138, 140, 141, 142, 143, 310, 147

[56] References Cited

U.S. PATENT DOCUMENTS

| | | | |
|---|---|---|---|
| 4,577,225 | 3/1986 | Pritchard | 358/140 |
| 4,633,293 | 12/1986 | Powers | 358/140 X |
| 4,654,708 | 3/1987 | de la Guardia et al. | 358/148 |
| 4,843,485 | 6/1989 | Reitmeler | 358/310 X |
| 4,860,098 | 8/1989 | Murphy | 358/148 |
| 4,862,268 | 8/1989 | Campbell et al. | 358/147 |
| 4,866,509 | 9/1989 | Guida | 358/141 X |

Primary Examiner—Heather R. Herndon
Attorney, Agent, or Firm—Heller, Ehrman, White & McAuliffe

[57] ABSTRACT

A digital processing system that generates signals for multiple digital video systems and formats including the specific case of PAL D2. The output is either from direct memory or component memory; encoded to composite at line rate, then and scan rate converted to subcarrier rates. The scan rate conversion process includes multiplication process of the signal by coefficients that are changeable with the signal so that conversion error is minimized. A single line of direct memory can be switched in for direct comparison of the outputs to allow detection of scan and encoding errors.

5 Claims, 3 Drawing Sheets

DIGITAL PROCESSING SYSTEM FOR VIDEO AND TELEVISION SIGNAL GENERATION

BACKGROUND OF THE INVENTION

The present invention relates to a digital processing system and method for processing video and television signal generation, such as in the generation of PAL test signals.

The PAL (Phase Alternation Line) standard, which is utilized in many European countries, pertains to a color television system in which the V component of subcarrier derived from a color reference burst is inverted in phase from one horizontal line to the next in order to minimize hue errors that may occur in color transmission. There are three basic PAL standards with different subcarrier frequencies.

In the prior art, in order to generate PAL digital test signals, one conventional approach needs convolution of two signals requiring between 50 to 100 multiplications per data sample point, which is quite expensive to achieve in real time.

One other approach is to do the calculations off line and store the results in a buffer memory holding data for eight fields. The data from a single line of video repeats itself once every eight fields for PAL. This off line approach is very expensive.

It would be desirable, therefore, to provide an improved digital processing capability for generation of PAL test signals.

SUMMARY OF THE INVENTION

It is an object of the present invention to provide an improved digital processing capability for generation of PAL test signals.

In one preferred embodiment of the invention, for generation of PAL test signals, the Y, U and V components are stored in memory. These signals are generated at a sampling rate that is close to four times the subcarrier frequency and is a multiple of the horizontal rate. Only one line of each of the components (Y, U and V) need be stored. These components are then encoded to form a digital PAL composite (PAL D2) signal.

The system includes a multiply accumulate processor for multiplying the encoded PAL samples with predetermined coefficients stored in memory to provide a PAL D2 test signal as an output. The sampling rate is exactly equal to four times the subcarrier frequency. This processing is then integrated with a digital storage memory to allow generation of D1 and D2 format signals for 525/60 systems and D1 format signals for 625/60. A reference line of D2 PAL is also stored in the digital storage memory for comparison to the digitally processed PAL D2. The clocking and memory addressing are then changed to match the system. The data is also switched from Y memory NTSC or processed Y, U, V memory for PAL. This enables the selection of memory direct or digitally processed signals.

Other objects, features and advantages of the present invention will become apparent from the following detailed description when taken in conjunction with the accompanying drawings.

BRIEF DESCRIPTION OF THE DRAWINGS

The accompanying drawings which are incorporated in and form a part of this specification illustrate an embodiment of the invention and, together with the description, serve to explain the principles of the invention.

DETAILED DESCRIPTION OF THE DRAWINGS

Figure 1:
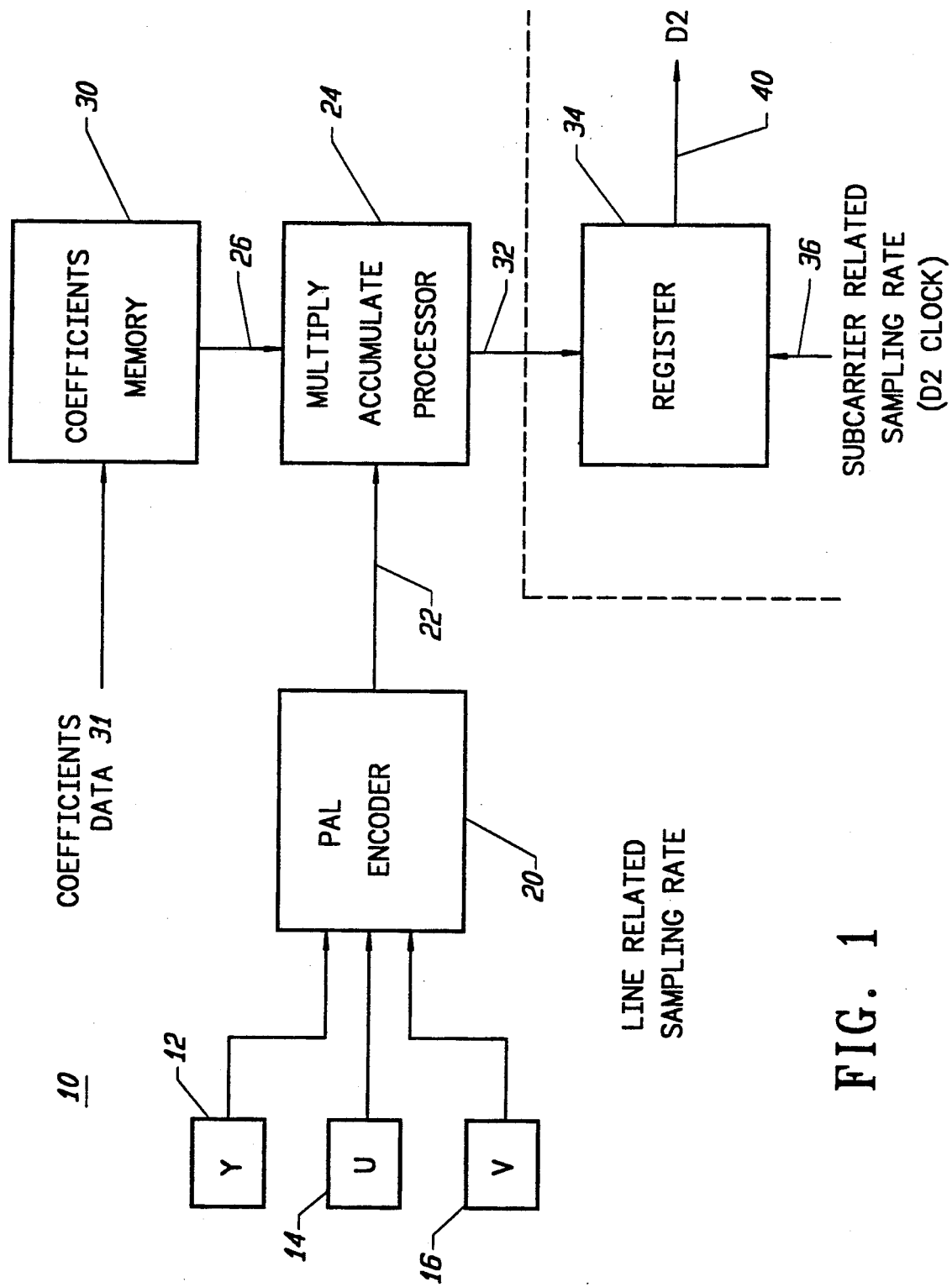
FIG. 1 depicts a block diagram of a digital processing system for video and television signal generation according to the present invention.

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

In order to clarify the detailed description of the present invention, a glossary of relevant terms is presented below:

DIGITAL COMPONENT (D1)—A digital format representing a component video where the data is at a 27 MHz rate for 525/60 and 625/50 and is locked to the line rate of the signal. The data is in parallel component form and represents Y, R-Y $C_R$, B-Y $C_B$ in a repeating sequence of CB, Y, Cr, Y.

This gives a data rate of 13.5 MHz for Y and 6.75 MHz for both R-Y and B-Y CCIR601 and SMPTZ RP defined this format.

Digital Composite (D2)—A digital format representing a composite video where the data rate is four times the subcarrier frequency of the system and the data represents the digital value of the composite analog signal. (14.3181 MHz for NTSC, 17.734475 for PAL).

NTSC (National Television System Committee)—The name of two standardization groups, the first of which established the 525 scanning-line-per-frame/30 frame-per-second standard, and the second of which established the color television system currently used in the United States; also the common name of the NTSC-established color system. NTSC is used throughout North America and Central America, except for the French islands of St. Pierre and Miquelon. It is also used in much of the Caribbean and in parts of South America, Asia, and the Pacific. It is also broadcast at U.S. military installations throughout the world and at some oil facilities in the Middle East. Barbados was the only country in the world to transmit NTSC color on a non-525-line system; they have since switched to 525 lines. Brazil remains the only 525-line country to transmit color TV that is not NTSC.

PAL (Phase Alternation by Line)—A common composite color transmission system (like NTSC) used in many countries of the world where there are 625 scanning lines per frame and 25 frames per second. Brazil is the only known country transmitting PAL on 52560 systems.

B-Y (U)—A chrominance component of the video signal that represents the chrona amplitude of the 0/180° subcarrier (sometimes referred to as U in PAL).

R-Y (V)—A chrominance component of the video signal that represents the chroma amplitude of the 90/270° subcarrier (sometimes referred to as V in PAL).

Y (Luminance)—A component of the video signal that represents the brightness of the visual information, so named because it is in the Y-axis of the spectral sensitivity chart for the human visual system.

COMPOSITE—A television system in which chrominance and luminance components of the video signal are combined into a single signal, as they are in NTSC or PAL; any single signal comprised of several components.

SUBCARRIER—An auxiliary information carrier added to the main baseband signal prior to modulation. The most common example in television is the NTSC color subcarrier. Many TV schemes propose adding additional subcarriers to NTSC.

ENCODERS—Devices that change component signals to composite signals; sometimes for devices that convert analog signals into digital form.

FIELD—One continuous vertical scan of an image. In a progressive scanning system, all of the scanning lines comprising a frame also comprise a field. In an interlaced scanning system, all of the odd-numbered scanning lines comprise a field, and two sequential fields comprise a frame.

FRAME—One complete vertical scan of an image for a progressive scanning system. A frame comprised of two fields in an interlaced scanning system.

VIDEO FORMATS—Video process within the standards such as composite, component, D1 and D2.

VIDEO STANDARDS—A video system standardized within a group of countries such as NTSC 525/60 for U.S./Canada and PAL 625/50 for Europe.

Referring now to FIG. 1, a block diagram of the digital processing system for video and television signal generation is depicted. The embodiment of FIG. 1 provides for generation of PAL D2 test signals as an output.

The system 10 of FIG. 1 includes memories 12, 14, 16 for storing the Y, U and V components, respectively, of a PAL standard.

The system 10 also includes a PAL encoder 20, the output 22 of which is input to a multiply/accumulate processor 24.

The system 10 also includes a coefficients memory 30, the output 26 of which is also input to processor 24. The interpolated composite PAL output 32 of processor 24 is input to register 34 which also receives a subcarrier related sampling rate (D2 clock) 36. The PAL D2 output 40 of register 34 is the PAL D2 test signal.

For generation of PAL test signals, Y, U and V components are stored in memories 12, 14, 16 respectively. These signals are sampled by a line related clock (24) at a rate that is close to four times the subcarrier frequency and is a multiple of the horizontal rate. The second criterion requires that only one line of each of the components (Y, U, V) be stored. These components are then encoded in PAL encoder 20 to form a digital PAL composite signal 22. This is almost the D2 format. The sample rate needs to be changed to four times the subcarrier frequency. Since the difference between rates is 100 Hz and the rate is 17.7 MHz, the phase shift during a single line is only 0.576°.

The problem becomes one of interpolating between two sample points using the same interpolation for the points in one line. The next line will have a slightly different interpolation. The interpolation is accomplished using a sin x over x function modified by a window function. The window function changes as the interpolation interval changes (line to line) to improve the overall response of the signals.

In the PAL format, the interpolation interval repeats every 157 lines. The interpolation is realized with the accumulation of eight multiplies of samples and coefficients. There are 157 sets of these coefficients (one set for each line). Coefficient memory 30 stores the predetermined interpolation coefficients and multiply/accumulate processor 24 performs the necessary multiplies of the samples and coefficients. The interpolation coefficients may be changed with the test signals to minimize errors. These would be loaded through coefficient data 31 into coefficient memory 30.

One conventional approach would require between 50 and 100 multiplies per data sample point. This would require very fast hardware and would be expensive to do in real time. Another alternative is to perform the calculations off line and store the results in a buffer memory holding data for eight fields. The data from a single line of video repeats itself once every eight fields for PAL. The off line approach requires a relatively large memory for approximately 3 million data points and is also very expensive to implement.

Figure 2:
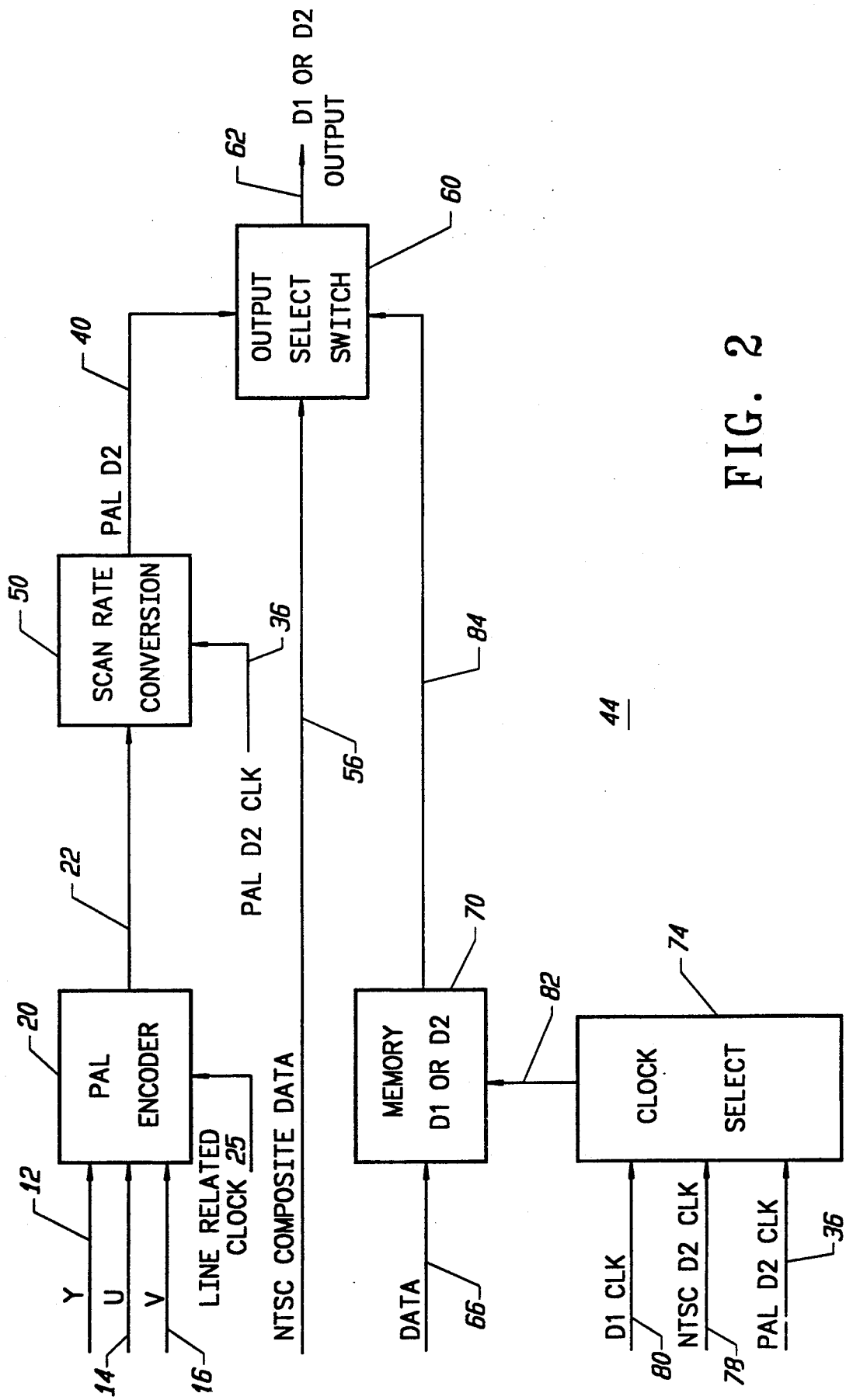
FIG. 2 depicts a block diagram of another embodiment of a digital processing system according to the present invention.

Referring now to FIG. 2, another embodiment of a digital processing system 44 according to the present invention is depicted.

In FIG. 2, similar aspects of a system 10 of FIG. 1 are utilized in FIG. 2. The Y, U and V components 12, 14, 16, respectively, of a video signal are input to PAL encoder 20. The output 22 of PAL encoder 20 and the PAL D2 clock 36 are then input to scan rate conversion 50, which possesses the coefficient memory 30 and the multiplier accumulate processor 25. The output of scan rate conversion 50 is the digital PAL composite signal PAL D2 40, which is input to a conventional data switch 60.

Data switch 60 also receives NTSC composite data (NTSC D2) 56 so that the output 62 of data switch 60 could be either NTSC D2 or PAL 1D2 standards (depending on whether the desired format is PAL or NTSC).

In FIG. 2, data 66, comprised of D1 525, D1 625, D2 525 and one line D2 625 data, is input to memory 70 to supply data for D1 or D2 formats, in 525/60 or 626/50 scanning standards.

An appropriate clock, such as D1 clock 80, NTSC D2 clock 78 or PAL D2 clock 36, is input to clock select 74, the clock selects output 82 which is input to memory 70 to provide for selection of the data associated with the format in memory 70.

The output 84 of memory 70 is also input to data switch 60, which performs a signal selection switching between the multiple inputs, input 84 and PAL D2 40 or NTSC composite data 56 as described above, to form an output 62, the selected digital signal.

Using the D1/D2 memory 70, a single line of the noninterpolated D2 PAL video at output 84, can be substituted by the interpolated D2 PAL video 40 in the output select switch 60 for a direct comparison of the two. This can be done once every two fields at a selected vertical position within the two fields. This allows the operator to determine the errors associated with the scan rate conversion for a particular test signal. The interpolation coefficients can then be selected or modified to minimize the errors.

When the generator is in the D1 output mode, the same memory 70 can store the D1 data either in 525/60 or 625/50 scanning standard for direct output. This is done by changing the clock rate from D2 to D1 clocks and shifting the memory addressing using clock select 74. The alternative scheme would be to have separate memories, separate clocks and separate address generators to get the two outputs.

Figure 3:
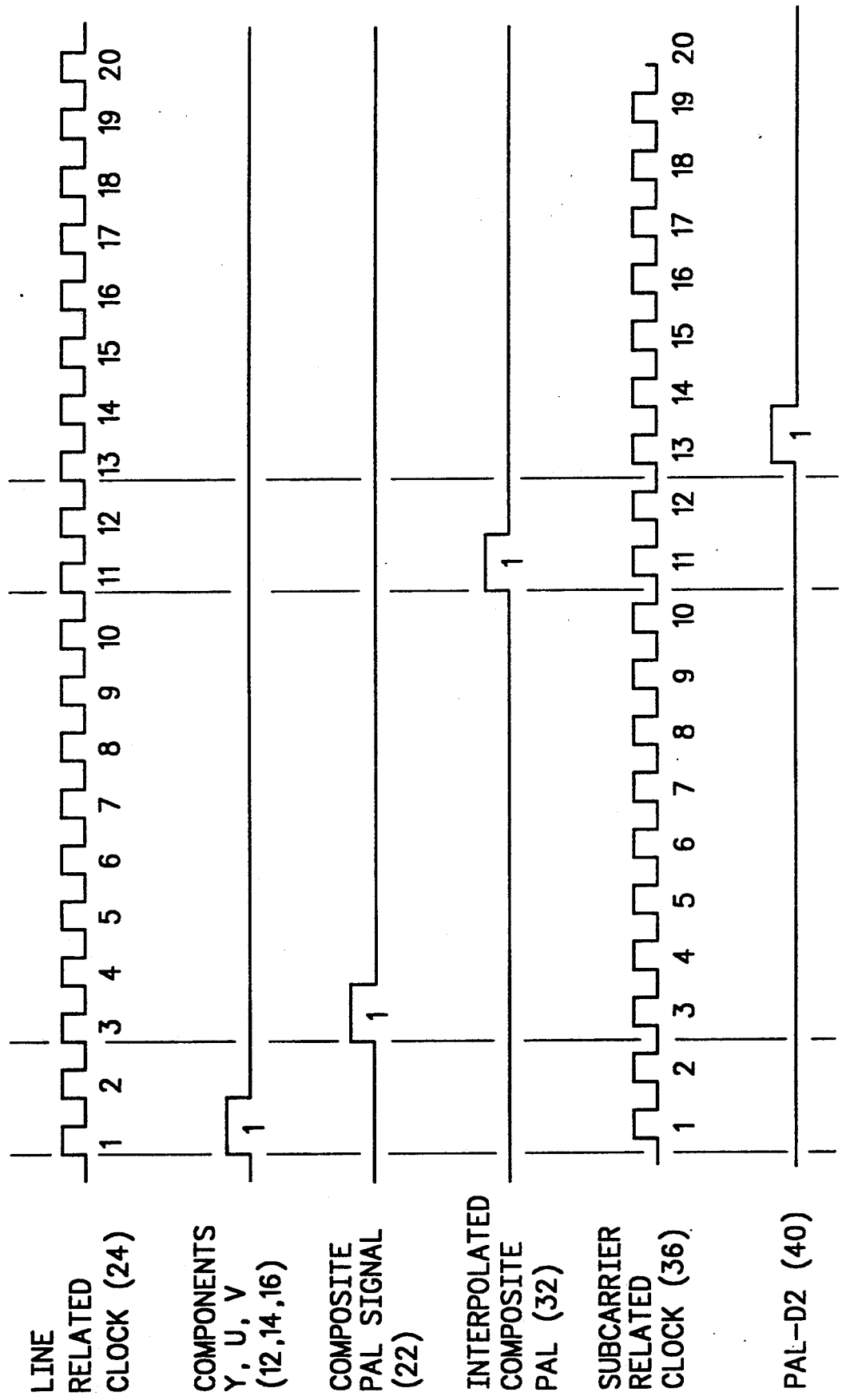
FIG. 3 depicts a timing diagram for PAL test signal processing according to the present invention.

A timing diagram for the PAL signal processing of FIGS. 1 and 2 is shown in FIG. 3.

The foregoing description of the preferred embodiment of the present invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical application to thereby enable others skilled in the art to best utilize the invention and various embodiments and with various modifications as are suited to the particular use contemplated. It is intended that the scope of the present invention be defined only by the claims appended hereto.

What is claimed is:

1. A digital processing system comprising
    test signal memory means for storing one video line for each component of a first digital video standard test signal clocked by a video line rate related clock,
    encoder means for encoding the stored components to form a digital composite test signal,
    interpolation data memory means for storing interpolation coefficients corresponding to the stored components, and
    processor means for processing the digital composite test signal and the stored coefficients to form a full frame digital output test signal clocked at a rate different from the video line rate related clock.

2. A system as in claim 1 including data switch means for switching between said output test signal and a second composite data standard signal.

3. A system as in claim 1 including data switch means for switching between said output test signal and a second composite data signal which is not processed enabling direct comparison of signals for testing the interpolation coefficients.

4. A system as in claim 2 including digital test signal memory means for storing data in a first and a second digital format corresponding to said first and second standards, clock select means for selecting the clock rate corresponding to said first and second formats, said data switch means including means for outputting data corresponding to said first and second formats in said first and second standard.

5. A digital signal generator system comprising a one line test signal memory, a processed digital test signal memory, and a digital test signal memory, said system including means for selecting during a video frame a digital output from the test signal memory, from the processed test signal memory, or from the digital test signal memory and means for outputting said digital output to conform to any one of multiple digital video formats with correct clock and data rates.

* * * * *